United States Patent [19]

Stol

[11] 4,309,590
[45] Jan. 5, 1982

[54] NARROW GROOVE WELDING TORCH

[75] Inventor: Israel Stol, Monroeville, Pa.

[73] Assignee: Westinghouse Electric Corp., Pittsburgh, Pa.

[21] Appl. No.: 126,093

[22] Filed: Feb. 29, 1980

[51] Int. Cl.³ ............... B23K 9/32; B23K 9/225
[52] U.S. Cl. ............... 219/137.62; 219/136; 219/137.42
[58] Field of Search ............ 219/137.42, 137.62, 219/137.31, 75, 136, 137 R

[56] References Cited

U.S. PATENT DOCUMENTS

| | | | |
|---|---|---|---|
| 2,436,515 | 4/1948 | Swift | 219/75 X |
| 2,510,415 | 6/1950 | Pitcher | 219/137.42 |
| 2,544,711 | 3/1951 | Mikhalapov | 219/137.42 X |
| 3,048,691 | 8/1962 | Longstreth | 219/137.62 |
| 3,198,932 | 8/1965 | Weatlterly | 219/75 X |
| 3,204,076 | 8/1965 | Browning | 219/75 |
| 3,324,225 | 6/1967 | Thostrup | 219/137.42 |
| 3,514,567 | 5/1970 | Strang | 219/75 |
| 3,826,888 | 7/1974 | Garfield | 219/137.42 |

FOREIGN PATENT DOCUMENTS 1055120  5/1979  Canada ............... 219/137.62

*Primary Examiner*—Elliot A. Goldberg
*Attorney, Agent, or Firm*—F. J. Baehr, Jr.

[57] ABSTRACT

A narrow groove welding torch having an internally insulated metallic housing and a rectangular cross section with cooling ducts and shielding gas ducts disposed within the housing.

5 Claims, 3 Drawing Figures

4,309,590

NARROW GROOVE WELDING TORCH

BACKGROUND OF THE INVENTION

This invention relates to welding torches and more particularly to an internally insulated welding torch for making narrow groove welds.

Narrow groove welding is particularly applicable to welding large heavy sections where the amount of weld metal and number of passes is appreciable. In such welding operations tough, rugged, dependable torches which will fit into the deep narrow weld grooves are a necessity, if high quality welds are to be achieved.

SUMMARY OF THE INVENTION

In general a narrow groove welding torch, when made in accordance with this invention, comprises an elongated electrode guide having cooling ducts extending the length thereof and having a generally rectangular cross section; an elongated housing having a generally rectangular cross section and having cooling ducts and gas ducts extending the length thereof; and elongated insulating strips having a generally rectangular cross section disposed between the electrode guide and housing to provide electrical insulation therebetween to form a strong and durable welding torch.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENT

Figure 1:
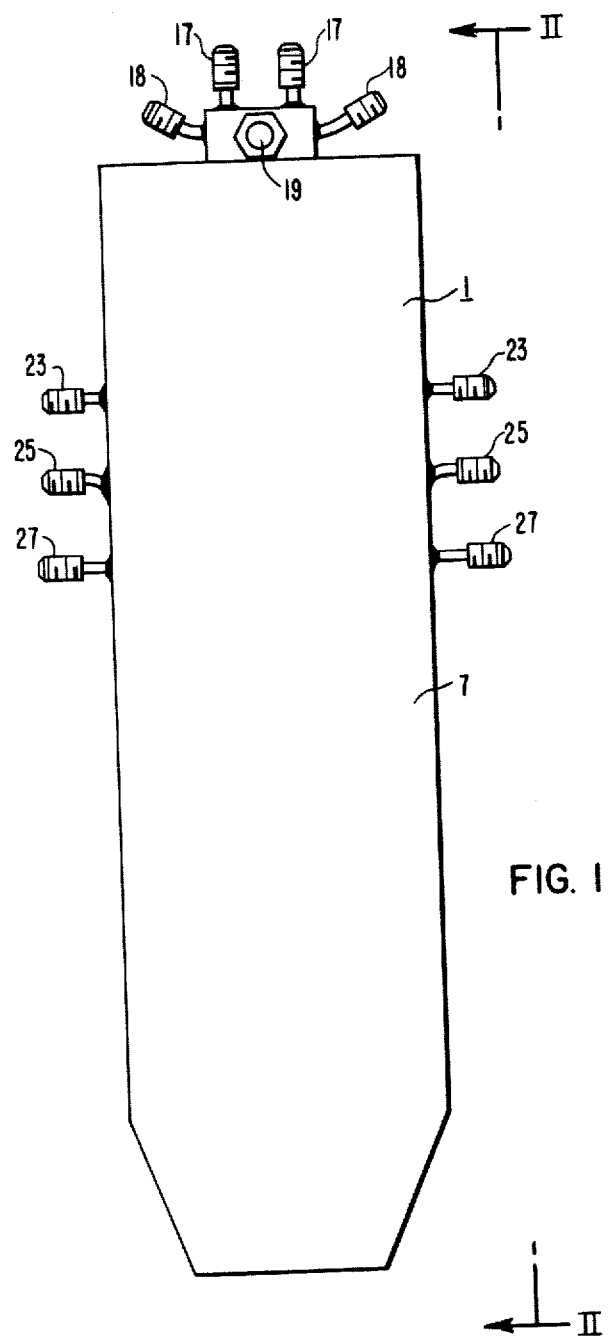
FIG. 1 is a front elevational view of a welding torch made in accordance with this invention.

Referring now to the drawings in detail there is shown a welding torch 1 for producing narrow groove welds. The torch 1 comprises an elongated electrode or guide 3 having a generally rectangular cross section and water or cooling ducts 5 disposed therein; an elongated metal housing or sheathing 7 of generally rectangular cross section having water or cooling ducts 9 and shielding gas ducts 11 generally extending the length thereof; and elongated insulating strips 13 and insulating ribbons 14 of generally rectangular cross section disposed between the electrode holder 3 and the housing 7.

Figure 3:
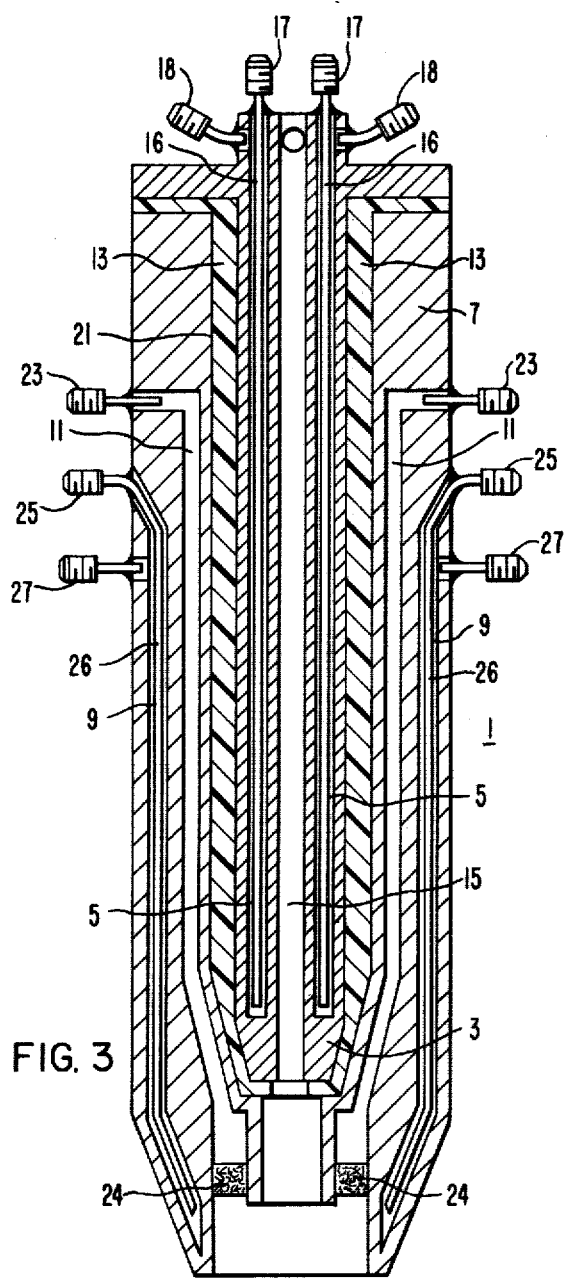
FIG. 3 is a sectional view taken on line III—III of FIG. 2.
Figure 2:
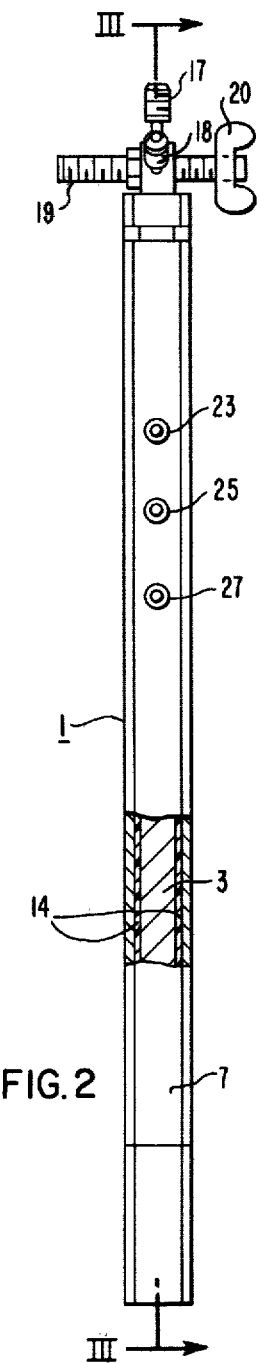
FIG. 2 is a side elevational view of the torch.

As shown in FIG. 3 the electrode guide 3 is preferably made of a good conductive material such as copper and has a centrally disposed bore 15, which may be adapted for consumable or non-consumable electrodes. Cooling ducts 5 are disposed in the electrode guide 3 adjacent the leading and trailing sides thereof. A bayonet tube 16 which extends from an inlet nozzle 17 is disposed within the cooling duct 5 and an outlet nozzle 18 enables circulation of coolant through the cooling duct. A threaded stud 19, to which an electrical lead (not shown) is attached is disposed on the upper end of the electrode holder 3 generally perpendicular to the longitudinal axis of the electrode holder 3. A wing nut 20 is utilized to secure a non-consumable electrode to the electrode guide 3.

The insulating strips 13 are made of an electrically insulating resilient material having a high dielectric strength such as Teflon and are disposed on two sides of the torch, the leading and trailing sides. The insulating ribbons 14 also made of Teflon are also utilized to electrically insulate or isolate the housing 7 from the electrode guide 3. While the preferred embodiment shows ribbons 14 made of Teflon, it is understood that contiguous surfaces of either the electrode guide 3, or the housing 7, or both may be coated with an insulating material provided the coating has sufficient resilience and dielectric strength to prevent the formation of an arc if the torch housing 7 should accidently come into contact with the electrically hot workpiece.

The housing 7 has a central opening 21 shaped to receive the insulating strips 13, the insulating ribbons 14 and the electrode guide 3. The shielding gas ducts 11 are disposed on the leading and trailing sides of the central opening, have an inlet nozzle 23 on each side of the housing 7 and discharge into the central opening adjacent the lower end through a diffuser 24, which is disposed in the lower end of each shielding gas duct 11. The cooling ducts 9 are disposed adjacent the leading and trailing sides of the housing 7 and generally extend the length thereof. The cooling ducts 9 each have an inlet nozzle 25 and a bayonet tube 26 extending from the inlet nozzle 25 to the lower end of the duct 9 to conduct the cooling fluid to the lower end of the duct. The ducts 9 also have outlet nozzles 27 disposed adjacent the upper ends of the ducts 9 on both the leading and trailing sides of the housing 7. The housing 7 completely surrounds the electrode guide 3 with a steel sheath that is rugged and electrically insulated from the electrode guide so that no arcing will occur even if the housing 7 contacts the walls of the narrow groove in the workpiece being welded.

The narrow groove welding torch hereinbefore described advantageously provides an external metallic sheath, which is mechanically durable, and which is electrically insulated from the electrode guide. The sheath can absorb shock and prevent damage to the insulation and provides water cooling on both sides of the insulation so that a resilient insulating material can be utilized. While a general rectangular shape is preferred the, cross-section may be any elongated shape.

What is claimed is:

1. A narrow groove welding torch comprising an elongated electrode guide having cooling ducts generally extending the length thereof and having a generally rectangular cross section; an elongated housing having a generally rectangular cross section and having cooling ducts and gas ducts disposed therein and generally extending the length thereof; and elongated insulating strips having a generally rectangular cross section disposed between the electrode guide and the housing and providing electrical insulation therebetween to form a strong and durable torch.

2. A narrow groove welding torch as set forth in claim 1 wherein the torch and guide have leading and trailing sides and the cooling ducts in the electrode guide are adjacent the leading and trailing sides thereof.

3. A narrow groove welding torch as set forth in claim 1 wherein the torch and housing have leading and trailing sides and the ducts in the housing are disposed adjacent the trailing and leading sides thereof.

4. A narrow groove welding torch as set forth in claim 1 wherein the torch, housing and guide have leading and trailing sides and the insulating strips are disposed between the leading side of the electrode guide and the leading side of the housing and disposed between the trailing side of the electrode guide and the trailing side of the housing.

5. A narrow groove welding torch as set forth in claim 1 wherein the cooling ducts in the electrode guide are disposed adjacent the insulating strips and the cooling ducts in the housing are also disposed adjacent the insulating strip and wherein the insulating strip is a resilient material having a high dielectric strength.

* * * * *